United States Patent [19]
Dorr

[11] Patent Number: 4,815,046
[45] Date of Patent: Mar. 21, 1989

[54] ULTRASONIC SENSOR SYSTEM

[75] Inventor: John A. Dorr, Crofton, Md.

[73] Assignee: Xecutek Corporation, Annapolis, Md.

[21] Appl. No.: 727,987

[22] Filed: Apr. 29, 1985

[51] Int. Cl.[4] .............................................. G01S 9/66
[52] U.S. Cl. ...................................... 367/95; 367/93;
367/103
[58] Field of Search ...................... 367/93, 86, 94, 95,
367/96, 100, 103, 104, 116, 135, 136, 140, 909;
49/25, 26, 28, 31; 340/19, 545, 565, 554, 556,
566; 342/27, 28

[56] References Cited

U.S. PATENT DOCUMENTS

| | | | |
|---|---|---|---|
| Re. 30,719 | 8/1981 | Mills | 367/96 X |
| 4,009,476 | 2/1977 | Lutz | 343/5 P X |
| 4,319,332 | 3/1982 | Mehnert | 342/27 |
| 4,338,553 | 7/1982 | Scott, Jr. | 49/31 X |
| 4,382,291 | 5/1983 | Nakauchi | 342/27 X |
| 4,458,446 | 7/1984 | Mochida et al. | 49/31 X |
| 4,459,689 | 7/1984 | Biber | 367/96 |
| 4,530,077 | 7/1985 | Dorr | 367/140 |
| 4,577,437 | 3/1986 | Gionet et al. | 49/25 |
| 4,654,834 | 3/1987 | Dorr | 367/96 |

FOREIGN PATENT DOCUMENTS 0067936  6/1978  Japan ...................................... 49/26

Primary Examiner—Brian S. Steinberger
Attorney, Agent, or Firm—Jim Zeeger

[57] ABSTRACT

An ultrasonic sensor system particularly for automatic door openers of a swinging door type, in addition to sensors (14) for people approaching a door for controlling opening and closing purposes, has at least one microprocessor controlled ultrasonic beam transducer (40, 41) for projecting an expanded unidirectional ultrasonic beam in a selected detection zone in the path of the swinging door and an ultrasonic detector for converting reflected ultrasonic beam energy into an analog electrical signal which constitute an acoustical image of objects in and bounding the selected detection zone. This acoustical image is stored or, a number characterized thereof is stored and this acoustic image is then compared with a later acoustical image of an object in the selected detection zone and then the comparison is used to signal a lack of correlation between the first and second acoustical images to produce a signal preventing operation of the door opening. In a preferred embodiment, aspect ambiguities and problems of acoustic "transparency" are avoided by using a pair of ultrasonic beam transducers projecting crossing beams and a pair of detectors which have their signals multiplexed and processed by a single computer microprocessor chip.

3 Claims, 5 Drawing Sheets

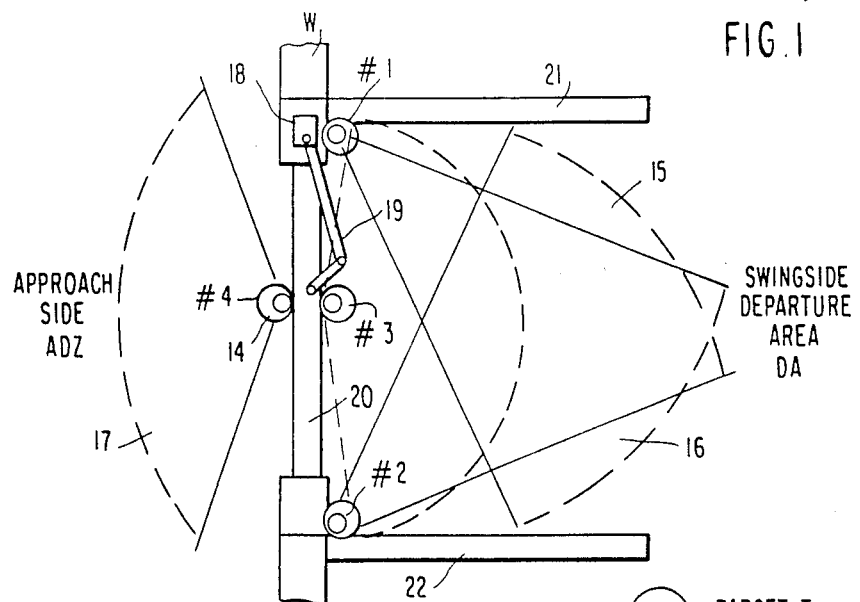
FIG. 1
FIG. 5
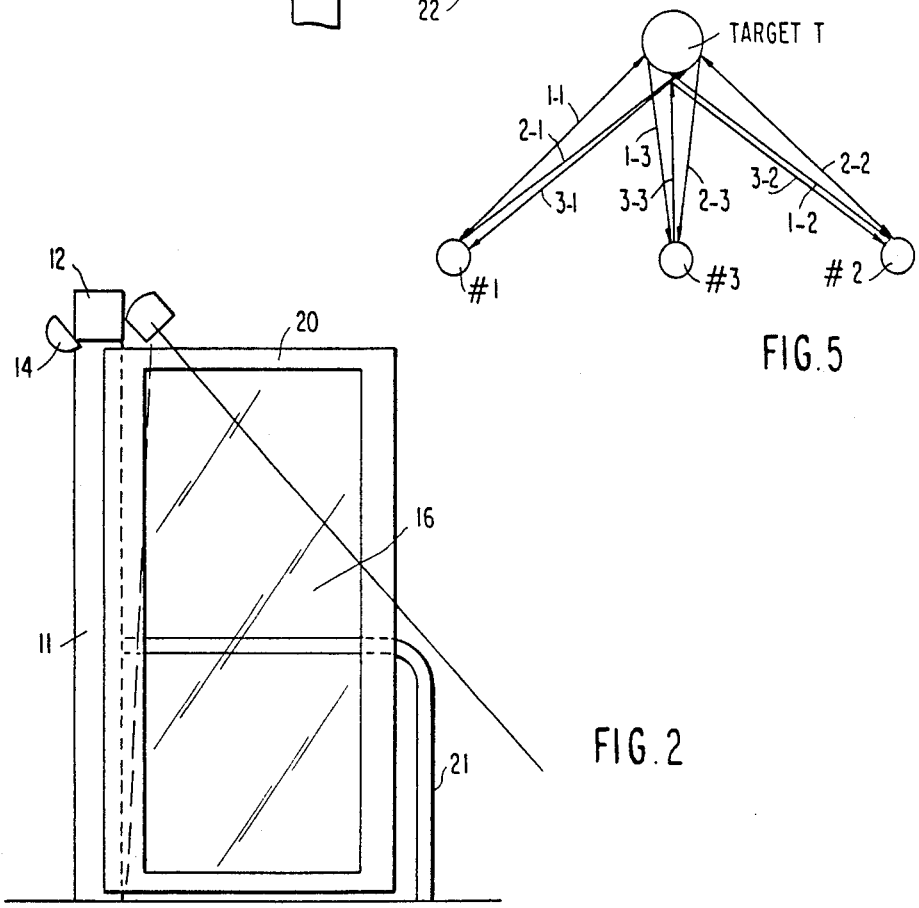
FIG. 2

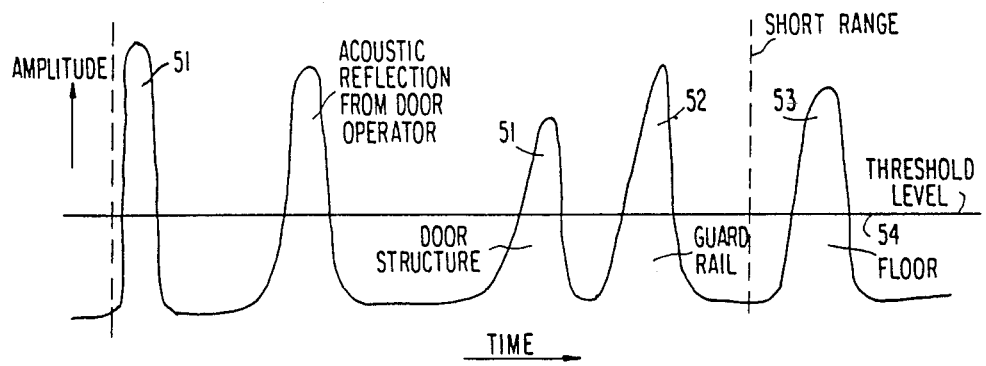
FIG.3 (DETECTED ANALOG SIGNAL LEVEL FROM RECEIVER DETECTOR)
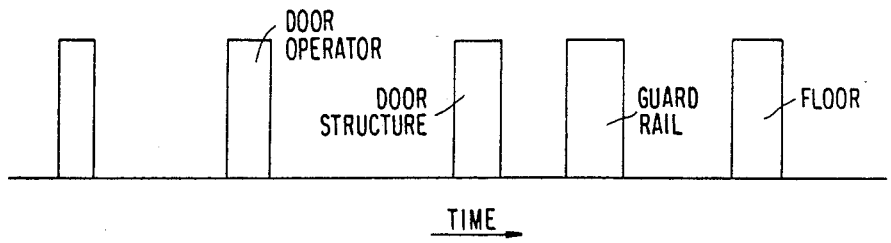
FIG.4a (DIGITAL SIGNAL FROM THRESHOLD DETECTOR)
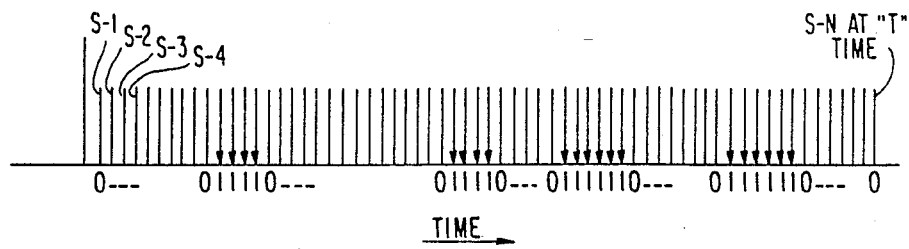
FIG.4b (SAMPLE SIGNAL)

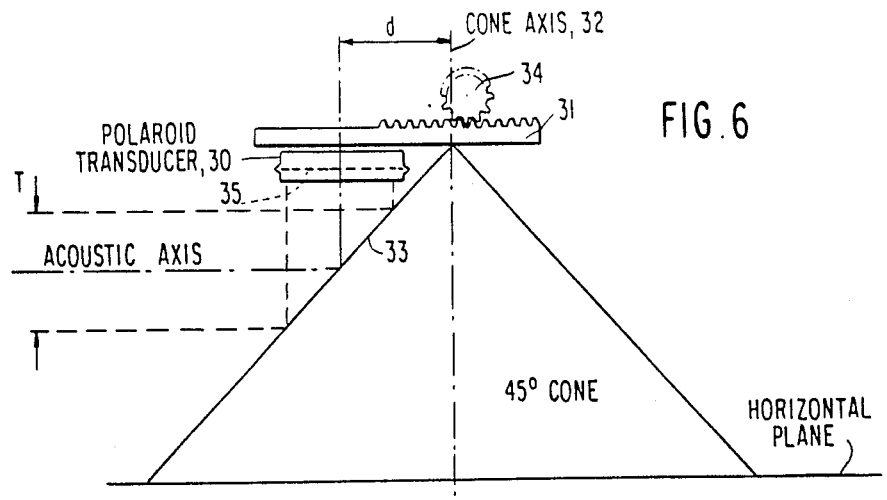
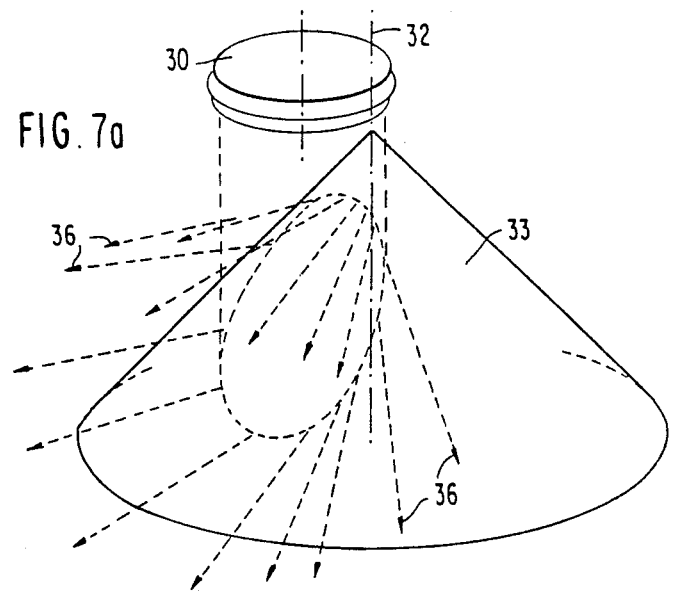
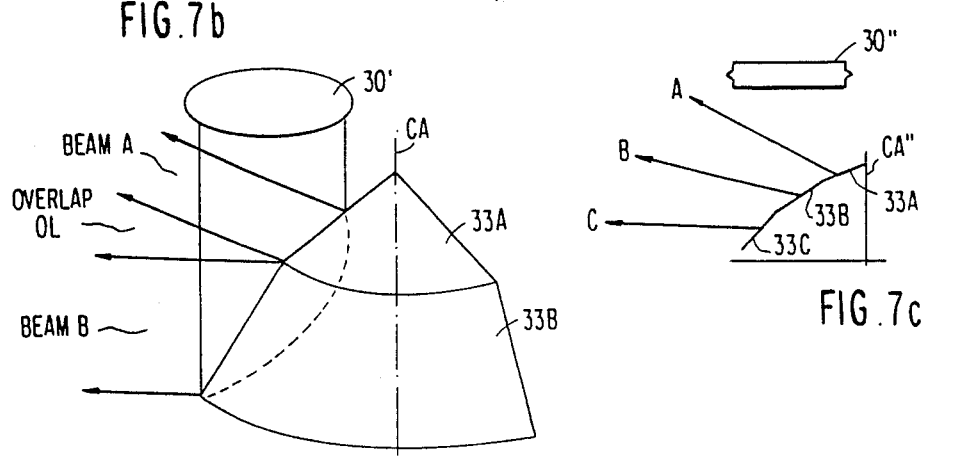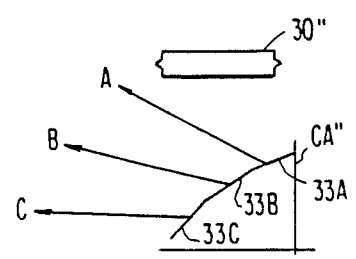

ULTRASONIC SENSOR SYSTEM

REFERENCE TO RELATED APPLICATIONS

This application is related to my U.S. application Ser. No. 496,158 filed May 19, 1983 and entitled "Efficient Low Cost Transducer System", now U.S. Pat. No. 4,530,077.

BACKGROUND DESCRIPTION OF THE PRIOR ART

Automatic door openers for swinging doors have been around for many years and there has always been a problem with respect to the swinging door striking people who get in the path of the swinging path of the door. The problem has been that in the past there has never been a presence detector that could detect the presence of a person in the area where the door is to swing open and when it is closed that ignores all other objects that are in the swinging door scene such as guard rails that are on the side, bumper on the door, for push carts and the like. Motion detectors cannot be used because when the door opens and the person stands motionless, the door can swing open and hit the motionless person which means a law suit if the person is injured. New findings regarding adverse biological effects of microwaves on the living organisms may require limiting use of microwave door systems. Basically, the only thing that's been commercially available is the rubber mat which detects somebody standing on it and it works perfectly well but has the problem, of course, that architecturally it isn't very nice, it collects dirt, has to be replaced and people don't like them at all. The long term cost of such mats and the lift cycle of them is high because they have to be replaced and they have to be maintained. There are numerous radiant energy systems, such as microwave, infrared and visible light systems which provide presence or absence signals, motion detection to detect approach and departure of objects. The object of the present invention is to provide a presence sensor that will detect people in the detection zone whether the door is open or the door is closed and ignore other objects which are normally in the scene such as the guard rails, the door operator and the like.

The present invention is particularly applicable to automatic door opener systems for swinging doors having a door operator and sensors for detecting a person for whom the door is to be opened for producing a door opening signal which is coupled to the door operator to open the swinging door. According to the present invention, at least one, and preferrably a pair of microprocessor controlled ultrasonic beam transducer, project an ultrasonic beam in a selected detection zone which includes the path of the swinging door and ultrasonic detector for converting ultrasonic beam energy reflected to the beam transducers to an acoustic image of objects in the selected detection zone and then this acoustical image is compared with a later acoustic image of objects in the selected detection zone. This comparison results in a correlation signal which indicates correlation permitting the door to be opened, or the lack of correlation between the first and second acoustic images to produce a signal preventing operation of the door opening device. The acoustic image in the first instance is an analog signal which is converted to the equivalent of a digital acoustical image of objects in the selected detection zone. The digital acoustic image can be converted to a first characteristic number by sampling and the second acoustic image can be converted to a second acoustic number and these two numbers compared for a lack of correlation as an indication of the presence of an unwanted object in the detection zone. This conversion includes microprocessor controlled sampling means for sampling each of the digital acoustic images at a relatively high rate to produce the characteristic number. In order to improve the probability of having a favorable aspect viewing of acoustic mirror-like targets, that is, planar acoustic reflectors that may be carried by a person, for example, a sheet of plywood or flat metal plates or glass plates into a hardward store, a second ultrasonic beam transducer projects a second beam at a predetermined angle into the selected detection zone in the path of the swinging door. Reflected ultrasonic beam energy is converted to another analog signal constituting a third acoustic image of objects in the selected detection zone, this acoustic image being compared with the one from its second acoustical image so as to provide for the electrical system "viewing" the different pathways of reflected acoustic energy from any object that may be in the selected detection zone from different angles so as to improve the probability of having a favorable aspect of viewing mirror-like targets which may be carried by persons in the selected detection zone.

In the preferred embodiment, low cost Polaroid (R) type beam transducers are utilized in conjunction with beam transformers as disclosed in my application Ser. No. 496,158 filed May 19, 1983 now U.S. Pat. No. 4,530,077. In such cases, the beam angle can be closely tailored to accomodate the desired beam detection zone without inclusion of remote objects and a plurality of the detectors according to the present invention can be multiplexedly controlled from a single microprocessor. In addition, the door opener mechanism can be controlled by acoustical sensors in accordance with the details of my above referred to patent to thereby result in a safe, very low cost acoustic system.

BRIEF DESCRIPTION OF THE DRAWINGS

The above and other objects, advantages and features of the invention will become apparent from the following specification when considered with the accompanying drawings wherein:

FIG. 1 is a top plan view of a swinging doorway for a commercial establishment showing the approach and swing sides thereof, FIG. 2 is a side elevation view thereof, FIG. 3 is a graph of the detected analog signal levels of one of the transducers on the swing side of the doorway plotted against time and thus constitute an analaog acoustical image of the scene depicted in FIGS. 1 and 2, FIG. 4a shows a digital acoustic image corresponding to the analog acoustic image shown in FIG. 3, FIG. 4b is a diagrammatic illustration of a sampling signal showing the manner of developing a characteristic number of the digitial acoustical image shown in FIG. 4a, FIG. 5 is a top view showing a pair of transducers which are utilized to solve the aspect problem when, for example, a person carrying an acoustic reflector such as a door, a flat metal sheet and the like, stands in the selected detection zone and the reflector making the person acoustically transparent because of the reflections from the object the person may be carrying, FIG. 6 is a view of the transducer assembly as shown in my application Ser. No. 496,158 now U.S. Pat. No. 4,530,077, FIG. 7 is a side perspective view showing the expansion of the beam along the acoustic axis.

DETAILED DESCRIPTION OF THE INVENTION

Figure 8:
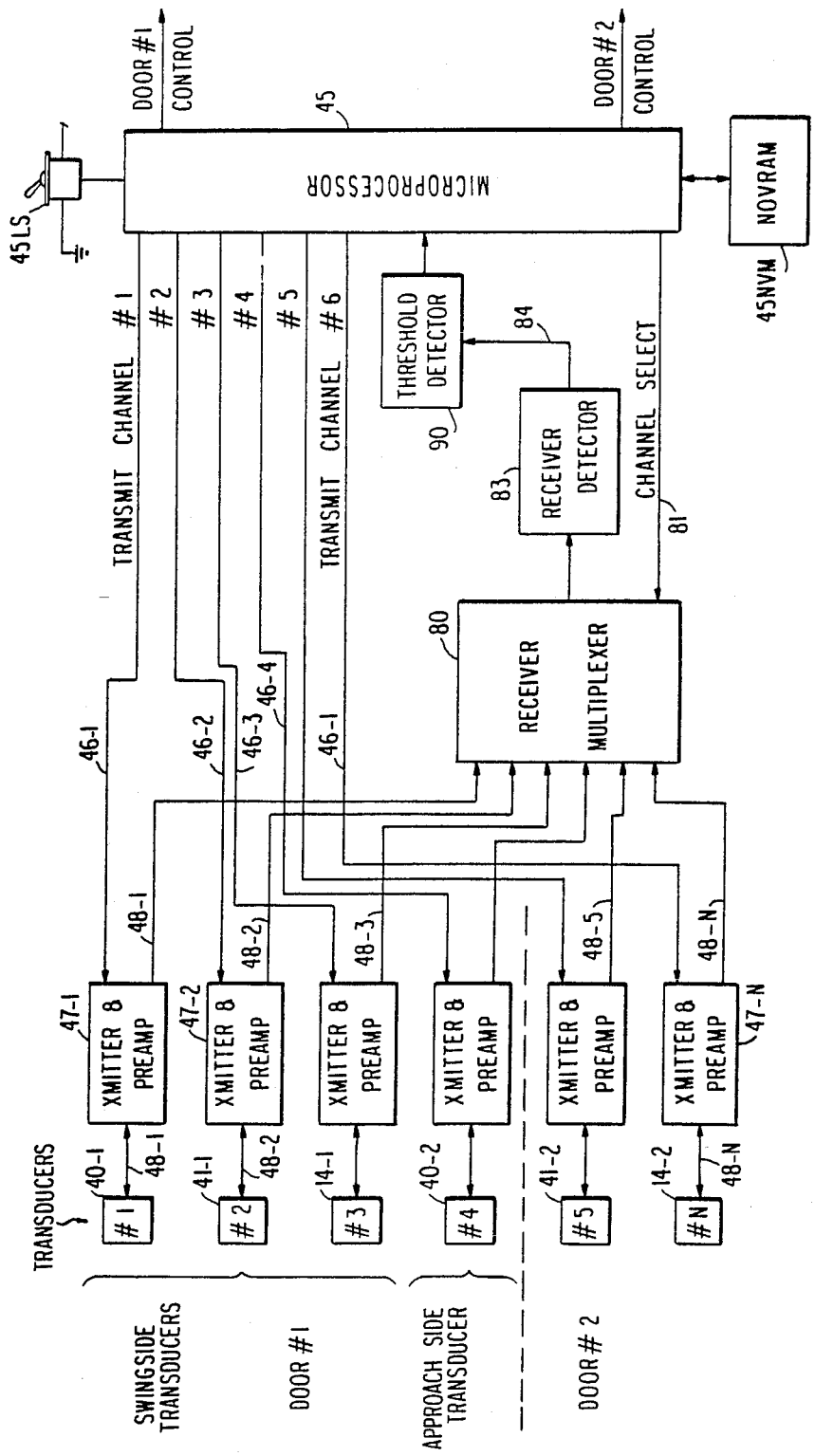
FIG. 8 is a block diagram of the signal processing circuitry incorporating the invention showing control of multiple door systems by a microprocessor.

Referring to FIGS. 1 and 2, a doorway is shown in a wall W, the doorway including conventional framing, typically metal for commercial door fronts, which includes joint or vertical risers 10 and 11 constituting a strike member and hinge member, respectively, and a horizontal support 12 with a swinging door 13 hingedly supported on vertical riser 11. An approach side transducer 14 projects unidirectional beam 16 at an approach side detection zone ADZ at the approach side AP of the doorway DW and, upon detecting the approach of a person, energize door operator 18 which is coupled by a linkage 19 to the door 20 causing the door to swing open on an arc which includes the swingside departure area DA. This departure area DA is normally protected by pairs of guard rails 21 and 22 and, in the prior art, some form of presence detector, typically a mat switch, microwave or infrared detectors and the like for detecting the presence of a person or object in the swinging path of door 20. The transducers utilized in the preferred embodiment of this invention are low cost ultrasonic transducers of the type disclosed in my above referred to U.S. Pat. No. 4,530,077 entitled "Efficient Low Cost Transducer System". Such transducers are shown in FIGS. 6 and 7 hereof and, as shown in FIG. 6, a planar electrostatic acoustic transducer or generator 30, which, as noted above, in the preferred embodiment, is a Polaroid Corporation type electrostatic transducer, produces a conical ultrasonic beam at about 50 kHz that is approximately 10 degrees wide. Transducer 30 is supported on an adjustable frame 31 so that it is laterally adjustable relative to the axis 32 of beam transformer 33. Beam transformer 33 is a 45 degree cone reflector (90 degree apical angle) that is placed in the near field of the transducer 30 and the resulting beam acoustic axis lies in the plane normal to the axis of the cone and is in the direction of the displacement D (D=O), the resulting beam is omnidirectional in the normal plane; and when the displacement is very large (D=N), the resulting beam shape closely approximates the shape of the undisturbed transducer beam. The −3 db beam width in the plane contain the reflective acoustic axis and the axis of the cone (the vertical plane) varies from about 10 degrees at D=N to about 20 degrees at D=O. The transform beam width are unpredictable only in proportion to the unpredictability of the beam width of the transducer 30 themselves. To produce an expanded 40 degree beam of FIG. 6 for projection over the detection zone DZ of FIGS. 1 and 2, for example, the displacement should be approximately 1 inch (D=1"). The consequent beam width in the vertical plane of FIG. 6 is no more than 15 degrees and consequently, the resulting loss in signal to noise ratio is no more than 20log (10/15)=−3.5 db. The Polaroid Corporation type transducer 30 features a low Q (about 5.5) and therefore is very suitable for broadband (high resolution) operation.

Adjustment of the position of transducers 30 relative to the axis 32 of cone 33 is by means of a rack 31 and pinion 34 arrangement generally indicated in FIG. 6. Since the transducer in this embodiment is always positioned on one side of the cone, the right side of the cone may be physically eliminated. The geometric surface upon which the acoustic reflection takes place therefor has all points thereof in a surface which is generated by the revolution of a straight line about a fixed axis 32 which is normal to the plane of the electrostatic transducer. In FIG. 6, transducer element 30 is shown as including a planar element 35 which generates compression and rarefaction waves which are essentially perpendicular to its planar surface and hence the beam is relatively narrow.

As shown in FIG. 7, the projection of the planar element of the transducer 30 upon the conical surface 33 causes the points of impingement of the beam from the planar surface of element 35 in transducer 30 to be reflected at 90 degree angles, and with the curvature of the surface expanding the beam but only in the direction of curvature. The "thickness" of the beam T in the vertical direction (as illustrated with reference to FIG. 6) is unaffected by the beam transformer 33. The emitted or transmitted beam 36 is transmitted along the acoustic axis which, in this embodiment, is at a predetermined angle to horizontal so as to acoustically view a predetermined detection zone DZ. However, it will be appreciated that the acoustic axis may be at another angle so that the beam is essentially a thin wide/beam projected into the detection zone.

A pair of the transducers 40, 41 is positioned at each side of the swingside departure area of the doorway DW and project essentially crossing beams 15 and 16 into the swingside detection zone SDZ located between guard rails 21 and 22 and essentially all possible danger areas of the swinging path of the door 20 and approaches thereto so that any object or person moving into this zone will be sensed in advance of the door swinging open as will be described more fully hereafter. The times of transmission of each transducer is controlled by a microprocessor shown in FIG. 7 which can introduce a conventional jitter in the transmission rate (PRF) to avoid interference from other units.

In the block diagram shown in FIG. 8, a plurality of transducers shown in FIGS. 6 and 7 are controlled by a single chip microprocessor 45 which sends transmit signals under program control in any desired sequence on line 46-1, 46-2 . . . 46-N and the microprocessor can introduce a jitter in the transmit times to take into account acoustic velocity changes due to ambient conditions. These signals control convenient transmitter and preamplifier circuits 47-1, 47-2 . . . 47-N, which include conventional transmit and receive switches (not shown) to sent transducer drive pulse on lines 48-1, 48-2, 48-3 . . . 48-N and to receive and amplify return signals or echoes and apply same to lines 48-1, 48-2 . . . 48-N which presents or supplies these signals to conventional receiver multiplexer 80. Receiver multiplexer 80 is controlled by channel select signals from microprocessor 45 via multiplexer control lines 81. The output from multiplexer 80 are the signals received by each of the transducers and in a serial order, determined and controlled by single chip microprocessor 45, supplied on output line 82 to conventional receiver detector 83, the output of which on lines 84 is an analog signal which constitutes an acoustic image of objects in the swingside detection zone SDZ. This analog acoustic image may be compared with a stored analog image of the acoustic scene in the swingside detection zone SDZ to detect the entrance of some object in the detection zone in the swingside of door 20 and preclude opening thereof, but in the preferred embodiment, a digital version of the acoustic image is produced for analysis by the microprocessor to detect whether it is safe on the swingside of the door.

Thus, the preferred embodiment includes a threshold detection circuit 86 which detects when the analog signal rises above a given threshold level 54 (FIG. 3).

Referring now to the waveform shown in FIG. 3, this illustrates a detected analog signal level plotted against time and represents essentially an acoustical image of objects in the detection zone. As diagrammatically illustrated, the first pulse is the transponder trigger pulse or the transmitter pulse 50 signifying the beginning of the acoustical image. This is the envelope of the RF signal and the first thing that is seen is a signal reflection from the door operator 19 which opens and closes the door and says that the door is open. Pulse 51 represents the door structure, pulse 52 represents the guard rails 21 or 22 and pulse 53 is the acoustic reflection from the floor. If the threshold level 54 is set so that the peaks of the signal levels are detected then additional signal shown in FIG. 4a is the output of the threshold detector 90 shown in FIG. 7. The signal from the threshold detector 90 is supplied to a single chip microprocessor 45 (described more fully in connection with FIG. 7) which samples the digital signal beginning with 0.0, the end of the transmission pulse 50. Each sampling time S1, S2, S3, S4 . . . SN is sampled and at each place where there is a pulse to derive a characteristic of the acoustic image. In the sample signal illustrated in FIG. 4b, there are 21 (plus or minus) hits (X) which are assigned a value of "1" and non-hits are assigned a value of "0" and constitute, over a time T, and "1's" and "0's" constituting a characteristic number for the acoustic scene representative of the acoustic image shown in FIGS. 3 and 4a. When a person or other object comes into the acoustic scene or view of the transducers, this characteristic number will change to something else (a Δ]change) which is indicative that something is in the detection zone SDZ that wasn't there before. Microprocessor 45 can randomize the sampling somewhat to introduce a jitter, which is essentially jittering the sampling of the signal so that there is not only sampling at the same point relative to the target. In other words, the sampling is oscillating back and forth across the analog signal. The transmission interval can be changed to conform to what changes there may be in the ultrasonic velocity due to temperature, humidity, etc. in the atmospheric changes. The peaks of the signals shown in FIG. 3 are not utilized according to this embodiment but it is obvious the microprocessor can be programmed to analyze peak amplitudes, if desired.

The signal waveform constituting the acoustic image can be analyzed by the microcomputer to develop the statistics of the acoustic scene or view so that when the door is open there may be three different paths or four. The transducers can be triggered to transmit simultaneously or to transmit one or to transmit the other.

False alarm doesn't really affect the system very much because if there is a false alarm once a second and the sampling is at a very high rate, you have one false alarm a second, it doesn't make any difference if a person comes in and it says open the door and you have a false alarm on the other side and it says don't open the door, an instant later it will say all right to open the door.

Figure 9:
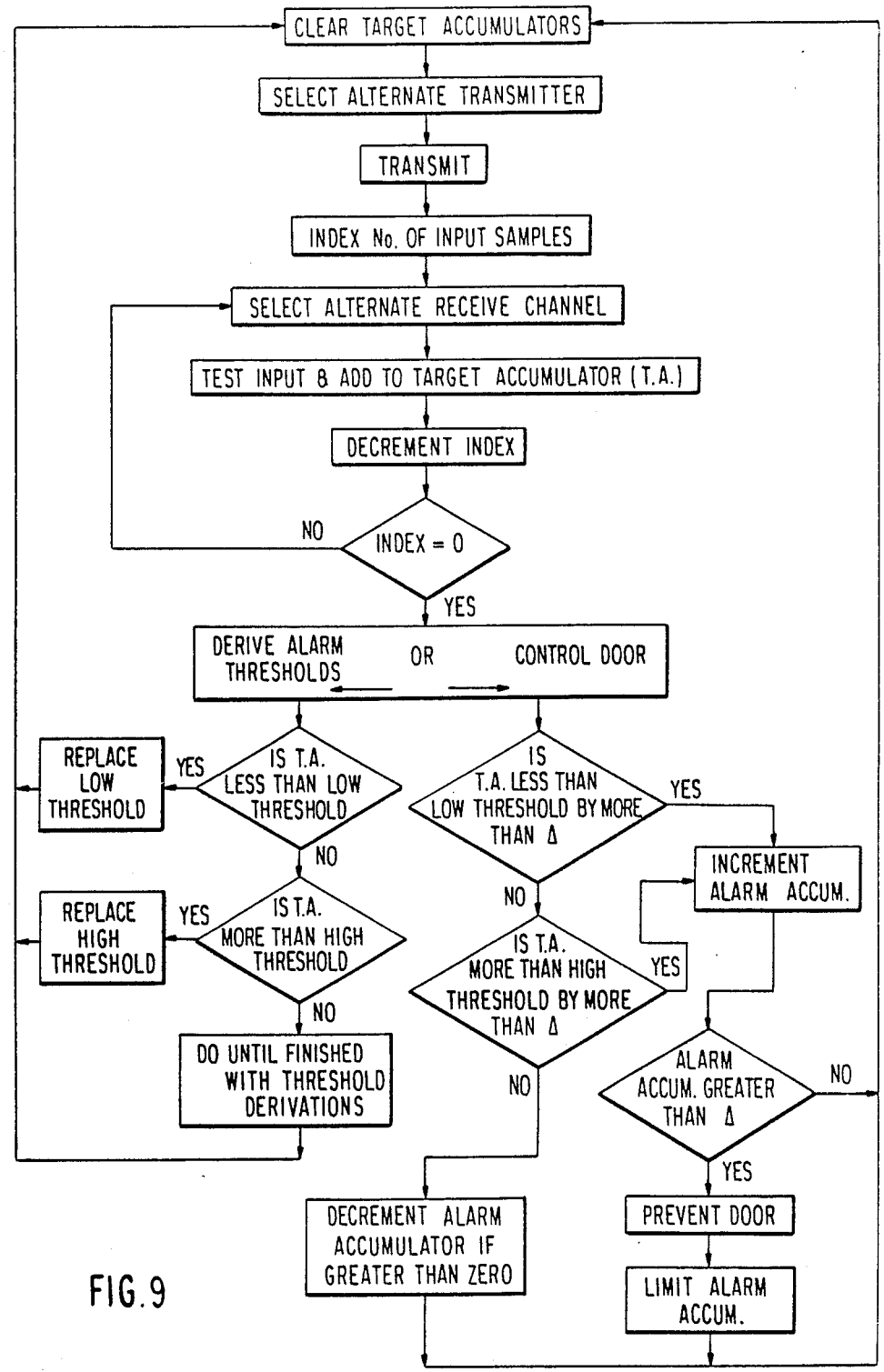
FIG. 9 is a swingside logic diagram for one door incorporating the invention.

The logic diagram of FIG. 9 forms the basis for the programming of microprocessor 45 to detect the entrance of an object in the swingside detection zone SDZ using the signal sampling technique shown in FIG. 4b and the aspect and ambiguity resolving concept of the invention using a pair of transducers 40 and 41 viewing swingside detection zone from different angles to assure unambiguous safe operation of the system, it improves the probability of having a favorable aspect of viewing a mirror target, e.g., a planar acoustic reflector where the acoustic reflections are angled away from the sending transducer. It will be appreciated that the same logic format applies to both doors and is carried out by a program stored in the microprocessor 45. It will also be appreciated that the acoustic image viewed by each transducer 40 or 44 will be different (see the paths of FIG. 5) and that each acoustic image is examined alternately and processed as shown in FIG. 9. The combined paths constitute further acoustic images (fifth and sixth acoustic images) which can be processed by the microprocessor 45 in the same manner. As noted in FIG. 5, the acoustic path to the target T will provide resolution of the aspect problem since any acoustic reflection which renders the target essentially "transparent" to one transducer (such as a sheet of plywood which will cause all reflections to be diverted from the transducer), cannot have the same effect on the other transducer.

While acoustic transducers are disclosed as being the preferred embodiment, especially for the swingside safety system, a mix of transducers can be used. For example, a mat or microwave or infrared sensor can be used on the approach side with ultrasonic acoustic transducers on the swingside, each being scanned or operatively examined in a predetermined sequence by microprocessor 45.

Microprocessor 45 may have programmable readonly memories (PROM) for storing the program and the sequence of transducer operation and multiplexer 80 channel selection on line 81. The random access memories (RAM) of microprocessors store the characteristic numbers of each acoustic image for use in the comparison, which is done by the microprocessor. The programming of the microprocessor is conventional and routine.

While there has been shown and described the preferred embodiment of the invention, it will be appreciated that this disclosure is for the purpose of illustration and various changes and substitutions of equivalent elements may be made without departing from the spirit and scope of the invention as set forth in the appended claims.

What is claimed is:

1. In an automatic door opener system, in which one or more swinging doors are controlled, each swinging door individually includes a door operator mechanism, at least one transducer for sensing approach to its respective door comprising, a plurality of ultrasonic transducer means for sensing objects in the swingside of said door, and wherein acoustically transparent objects can create an aspect problem to one or more of said ultrasonic transducer means in direct transducer to target directions, microprocessor means for controlling the operation of each said transducer means in a predetermined sequence and producing a door control signal for each said door operator mechanism, and wherein each said ultrasonic transducer on said swingside produce first acoustic images of the swingside of said door, said microprocessor means having a memory for storing acoustic images including said first acoustic images, and each said ultrasonic transducers on said swingside producing second acoustic images after said first acoustic images, said microprocessor comparing said first and second acoustic images from each ultrasonic transducer, respectively, to detect the presence of an object in said swingside and inhibit operation of said door operator mechanism during the presence of an object and wherein as a resolution to said aspect problem wherein a target may be acoustically transparent to any one of said ultrasonic transducers in the direct transducer to target directions, each said ultrasonic transducer being able to transmit and receive ultrasonic signals, said microprocessor means controlling the transmit and receive times, respectively of each of said ultrasonic transducers whereby any object in said swing side that may be acoustically transparent to one of said ultrasonic transducer means is not acoustically transparent to another of said ultrasonic transducer means.

2. The invention defined in claim 1, wherein at least one of said ultrasonic transducer means is controlled by said microprocessor means to sequentially receive ultrasonic signals transmitted by said plurality of ultrasonic transducer means whereby each acoustic path from a given ultrasonic transducer means to another of said ultrasonic transducer means constitute further acoustic images.

3. Zone detection apparatus comprising:
a first ultrasonic beam transducer means for projecting an ultrasonic beam along a first predetermined direction into a selected common detection zone,
second ultrasonic beam transducer means for projecting a second ultrasonic beam along a second predetermined direction different from said first predetermined direction and into said selected common detection zone,
detector means for converting ultrasonic beam energy from said first and second ultrasonic beam transducer means into first and second acoustical images, respectively, and means for storing said acoustical images, and
microprocessor means for comparing objects in said first acoustical image with objects in a third acoustical image in said first predetermined direction and objects in said second acoustical image with objects in a fourth acoustical image in said second predetermined direction whereby any object in said selected detection zone that may be acoustically transparent to one of said ultrasonic beam transducer means is not acoustically transparent to the other of said ultrasonic beam transducer means.

* * * * *